US012138918B2

(12) United States Patent
Takayama et al.

(10) Patent No.: US 12,138,918 B2
(45) Date of Patent: Nov. 12, 2024

(54) LIQUID DROPLET DISCHARGE APPARATUS

(71) Applicant: BROTHER KOGYO KABUSHIKI KAISHA, Nagoya (JP)

(72) Inventors: Haruhisa Takayama, Nagoya (JP); Atsushi Ito, Nagoya (JP); Yuya Kato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 108 days.

(21) Appl. No.: 17/937,865

(22) Filed: Oct. 4, 2022

(65) Prior Publication Data

US 2023/0142144 A1 May 11, 2023

(30) Foreign Application Priority Data

Nov. 5, 2021 (JP) ................................ 2021-180831

(51) Int. Cl.
*B41J 29/38* (2006.01)
*B41J 2/045* (2006.01)

(52) U.S. Cl.
CPC ....... *B41J 2/04588* (2013.01); *B41J 2/04581* (2013.01)

(58) Field of Classification Search
CPC ..... B41J 2/125; B41J 2/04588; B41J 2/04581
See application file for complete search history.

(56) References Cited

U.S. PATENT DOCUMENTS 6,322,193 B1 * 11/2001 Lian ......................... B41J 2/125 347/19
2011/0181652 A1 * 7/2011 Komatsu .................. B41J 2/125 347/19

FOREIGN PATENT DOCUMENTS

EP 1788375 A1 * 5/2007 ............ B01L 3/0268
JP 2010-131827 A 6/2010
JP 2015-066819 A 4/2015

* cited by examiner

*Primary Examiner* — Lam S Nguyen
(74) *Attorney, Agent, or Firm* — Baker Botts L.L.P.

(57) ABSTRACT

A liquid droplet discharge apparatus includes: a metallic discharge head configured to discharge a liquid droplet onto a print medium; an electrode arranged facing the discharge head; a voltage source configured to generate a potential difference between the discharge head and the electrode; a current detection part configured to detect a current flowing between the discharge head and the electrode; and a controller. The controller is configured to calculate a volume of the liquid droplet based on a current value detected by the current detection part, in a case that the liquid droplet is discharged from the discharge head in a state that the potential difference is generated between the discharge head and the electrode by the voltage source.

6 Claims, 9 Drawing Sheets

LIQUID DROPLET DISCHARGE APPARATUS

REFERENCE TO RELATED APPLICATIONS

This application claims priority from Japanese Patent Application No. 2021-180831 filed on Nov. 5, 2021. The entire content of the priority application is incorporated herein by reference.

BACKGROUND ART

Conventionally, there is a technique for detecting whether ink is discharged or not from a nozzle provided on a discharge head. For example, an apparatus which determines whether ink is discharged or not based on a current value detected at an electrode arranged facing the discharge head is known. According to this configuration, it is possible to determine, at the same time, whether ink droplets are discharged or not from a plurality of nozzles.

DESCRIPTION

However, there is such a case that a piezoelectric element deteriorates as the drive time thereof passes, in a preceding stage before the nozzle reaches a non-discharge or discharge failure, due to which the volume of ink droplet changes. Therefore, the discharge accuracy of each of the nozzles is lowered, which in turn leads to such a fear that any desired image quality cannot be obtained.

In view of the above-described situation, an object of the present disclosure is to provide a liquid droplet discharge apparatus capable of detecting a discharge malfunction before the nozzles reach the non-discharge.

According to an aspect of the present disclosure, there is provided a liquid droplet discharge apparatus including:

a metallic discharge head configured to discharge a liquid droplet onto a print medium;

an electrode arranged facing the discharge head;

a voltage source configured to generate a potential difference between the discharge head and the electrode;

a current detection part configured to detect a current flowing between the discharge head and the electrode; and a controller, wherein the controller is configured to calculate a volume of the liquid droplet based on a value of the current, which is detected by the current detection part under a condition that the liquid droplet is discharged from the discharge head in a state of the potential difference being generated between the discharge head and the electrode by the voltage source.

According to the present disclosure, by calculating the volume of the liquid droplet by the controller, it is possible to determine or discriminate, based on the volume of the liquid droplet, whether or not the piezoelectric element has deteriorated in the preceding stage before the nozzle(s) reaches the non-discharge. With this, it is possible to perform a correction for adjusting the volume of the liquid droplet based on the result of determination. Accordingly, it is possible to suppress any decrease in the discharge accuracy of each of the plurality of nozzles and to obtain a desired image quality.

According to the present disclosure, it is possible to provide a liquid droplet discharge apparatus capable of detecting the discharge malfunction before the nozzles reach the non-discharge.

In the following, a liquid droplet discharge apparatus according to an embodiment of the present disclosure will be explained with reference to the drawings. The liquid droplet discharge apparatus described below is merely an embodiment of the present disclosure. Therefore, the present disclosure is not limited to or restricted by the following embodiment, and any addition, deletion and/or modification can be made with respect to the present disclosure, without departing from the spirit of the present disclosure.

First Embodiment

Figure 1:
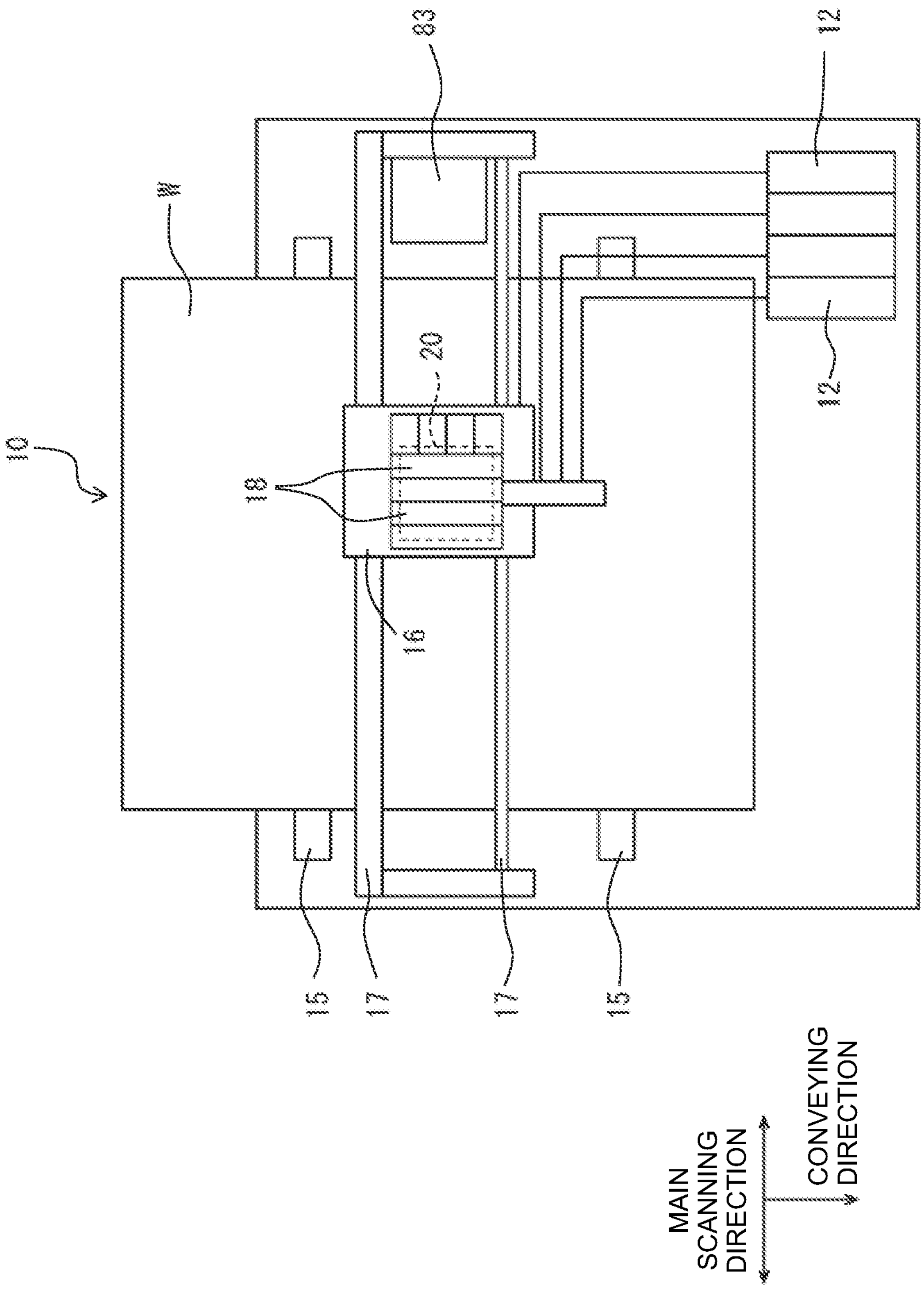
FIG. 1 is a plan view schematically depicting a configuration of a liquid droplet discharge apparatus.

As depicted in FIG. 1, a liquid droplet discharge apparatus 10 of the present embodiment is configured to discharge an ink droplet as an example of a liquid droplet, and is provided with: a storage tank 12, a carriage 16, a metallic discharge head 20, a pair of conveying rollers 15, a pair of guide rails 17, a sub tank 18, and a purge unit 83 corresponding to a maintenance unit. Further, in the liquid droplet discharge apparatus 10, a print medium W is placed on a platen which is not depicted.

The discharge head 20 is mounted on the carriage 16. The pair of guide rails 17 extends in a main scanning direction which is orthogonal to a conveying direction of the print medium W. The carriage 16 is supported by the pair of guide rails 17 and reciprocates in the main scanning direction along the guide rails 17. As a result, the discharge head 20 reciprocates in the main scanning direction. Further, for example, four pieces of the sub tank 18 are mounted on the carriage 16. Each of the sub-tanks 18 is connected to the storage tank 12 corresponding thereto, via a tube.

The pair of conveying rollers 15 are arranged parallel to each other along the main scanning direction. The conveying rollers 15 rotate in a case that a conveying motor which is not depicted is driven, whereby the print medium W placed on the platen is conveyed in the conveying direction.

An ink is stored in the storage tank 12. The storage tank 12 is connected to the discharge head 20 via an ink channel in order to supply ink to the discharge head 20. Further, the storage tank 12 is provided for each type of the ink. For example, the storage tank 12 is provided as four storage tanks 12, and black, yellow, cyan, and magenta inks are stored in the four storage tanks 12, respectively.

Figure 5:
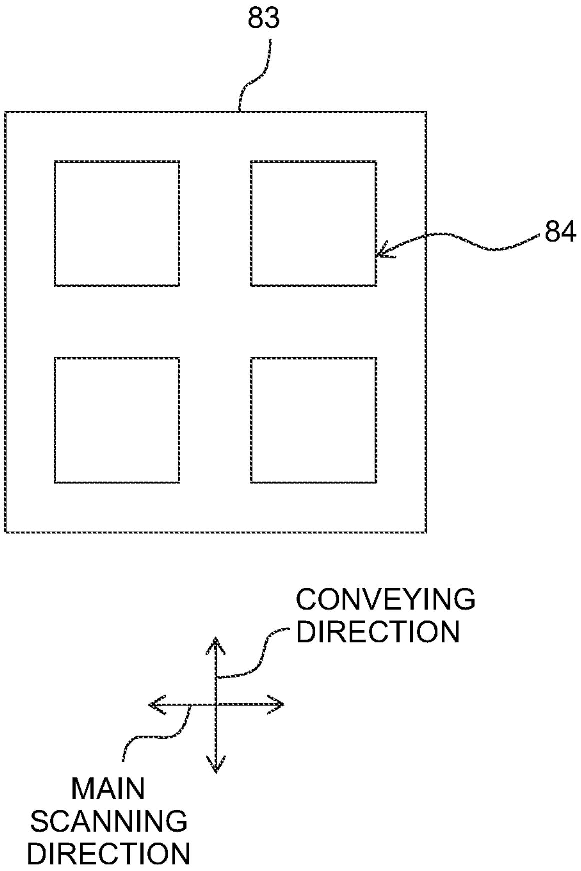
FIG. 5 is a plan view depicting a shape of an electrode in a purge unit.

In the purge unit 83, a purge processing for forcibly discharging ink from the nozzles 21, which will be described later on, is performed. Further, an electrode 84 (FIG. 5, etc.)

is provided on the purge unit 83. Note that the details of the electrode 84 will be described later.

Figure 2:
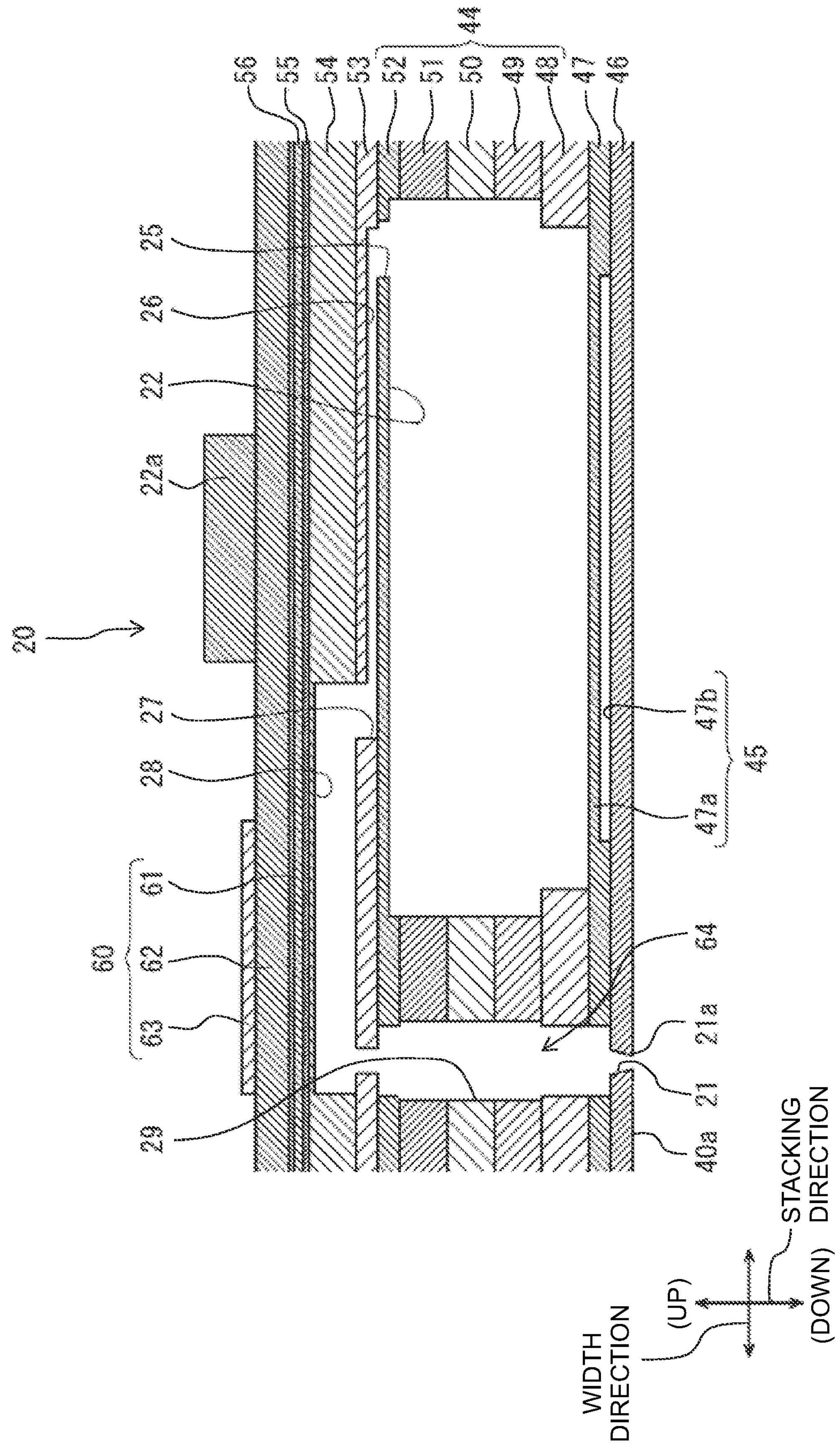
FIG. 2 is a cross-sectional view depicting a configuration of a discharge head in the liquid droplet discharge apparatus of FIG. 1.

The discharge head 20 moves in the main scanning direction orthogonal to the conveying direction. As depicted in FIG. 2, the discharge head 20 has a plurality of nozzles 21 configured to discharge or eject the inks. The discharge head 20 has a stacked body including a liquid channel forming body and a volume changing part. Inside the liquid channel forming body, a liquid channel is formed. A plurality of nozzle holes 21*a* are opened in a nozzle surface 40*a* which is a lower surface of the liquid channel forming body. The volume of the liquid channel is changed by driving the volume changing part. At this time, a meniscus vibrates in the nozzle hole 21*a* and the ink droplet is discharged.

As depicted in FIG. 2, the above-mentioned channel forming body of the discharge head 20 is a stacked body or laminated body of a plurality of plates; and the volume changing part includes a vibration plate 55 and an actuator (piezoelectric element) 60. An insulating film 56 is connected on the vibration plate 55, and a common electrode 61, which will be described later, is connected on the insulating film 56.

The plurality of plates includes, in order from the lower part, a nozzle plate 46, a spacer plate 47, a first channel plate 48, a second channel plate 49, a third channel plate 50, a fourth channel plate 51, a fifth channel plate 52, a sixth channel plate 53, and a seventh channel plate 54, and these plates are stacked on one another. The first channel plate 48, the second channel plate 49, the third channel plate 50, the fourth channel plate 51, and the fifth channel plate 52 construct a plate 44 for manifold.

Holes and grooves of various sizes are formed in each of the plates. Inside the liquid channel forming body in which the respective plates are stacked, the holes and the grooves are combined to thereby form the plurality of nozzles 21, a plurality of individual channels 64 and a manifold 22, as the liquid channel.

Figure 3:
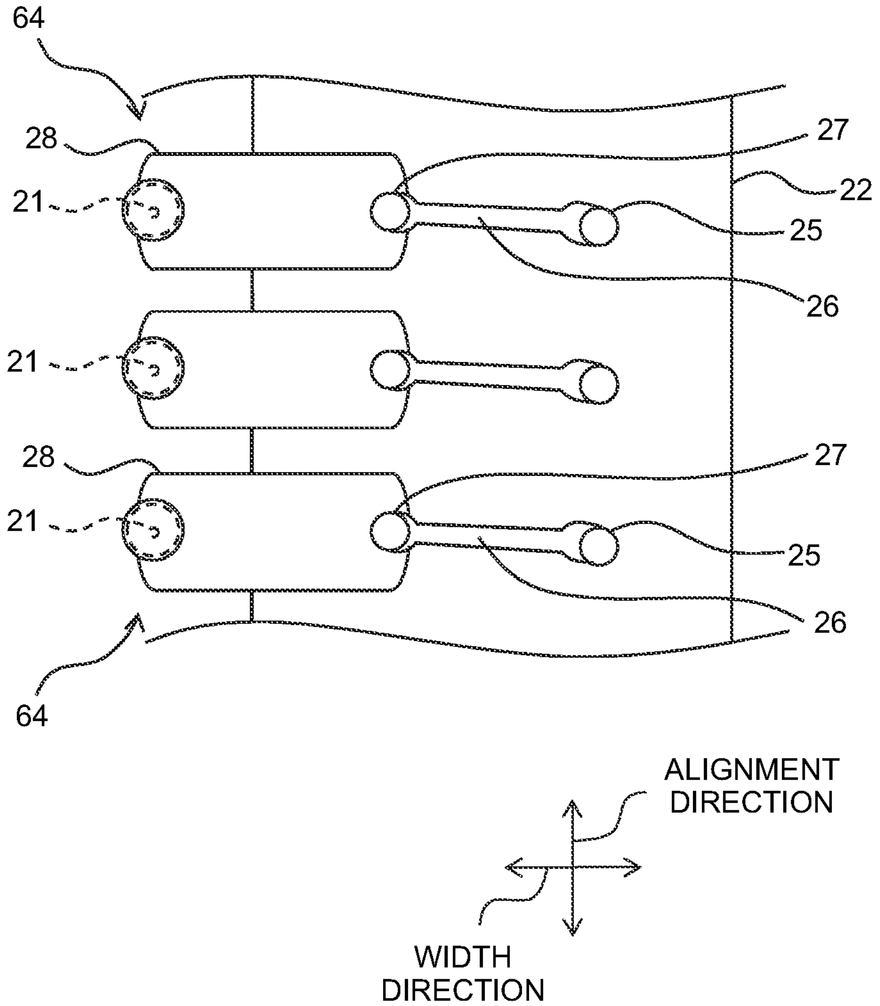
FIG. 3 is a plan view depicting a plurality of nozzles arranged side by side in an alignment direction.

Each of the plurality of nozzles 21 is formed so as to penetrate the nozzle plate 46 in a stacking direction. By arranging or aligning the plurality of nozzle holes 21*a* in an arrangement direction in the nozzle surface 40*a* of the nozzle plate 46, a nozzle array is formed in the nozzle surface 40*a*, as depicted in FIG. 3. The arrangement direction is a direction orthogonal to the stacking direction.

The manifold 22 supplies the ink to a pressure chamber 28, which will be described later, to which an ink discharge pressure is applied. The manifold 22 extends in the arrangement direction and is connected to an end of each of the plurality of individual channels 64. That is, the manifold 22 functions as a common channel for the ink. The manifold 22 is formed by overlapping, in the stacking direction, a through hole penetrating from the first channel plate 48 to the fourth channel plate 51 in the stacking direction and a recess recessed from the lower surface of the fifth channel plate 52.

The nozzle plate 46 is arranged at a location below the spacer plate 47. The spacer plate 47 is made of, for example, stainless steel. The spacer plate 47 is formed with a recess part 45 recessed, for example, by half etching, in a thickness direction of the spacer plate 47 from a surface, of the space plate 47, which is on the side of the nozzle plate 46. The recess part 45 has a thin part forming a damper part 47*a* and a damper space 47*b*. With such a configuration, the damper space 47*b* as a buffer space is defined between the manifold 22 and the nozzle plate 46.

A supply port 22*a* communicates with the manifold 22. The supply port 22*a* is formed, for example, to have a cylindrical shape, and is provided at one end in the arrangement direction of the manifold 22 (the longitudinal direction of the manifold 22). Note that the manifold 22 and the supply port 22*a* are connected by a channel which is not depicted and which is provided by penetrating each of an upper part of the fifth channel plate 52, the sixth channel plate 53, and the seventh channel plate 54.

Each of the plurality of individual channels 64 is connected to the manifold 22. In each of the plurality of individual channels 64, an upstream end thereof is connected to the manifold 22 and a downstream end thereof is connected to a base end of the nozzle 21. Each of the plurality of individual channels 64 is constructed by a first communication hole 25, a supply throttle channel 26 which is an individual throttle channel, a second communication hole 27, a pressure chamber 28, and a descender 29, and these constituent components are connected in this order.

A lower end of the first communication hole 25 is connected to an upper end of the manifold 22. The first communication hole 25 extends from the manifold 22 in an upward orientation of the stacking direction, and penetrates an upper part of the fifth channel plate 52 in the stacking direction.

An upstream end of the supply throttle channel 26 is connected to an upper end of the first communication hole 25. The supply throttle channel 26 is formed by, for example, half-etching, and is constructed of a groove recessed from a lower surface of the sixth channel plate 53. Further, an upstream end of the second communication hole 27 is connected to a downstream end of the supply throttle channel 26. The second communication hole 27 is formed so as to extend from the supply throttle channel 26 in the upward orientation of the stacking direction, and to penetrate the sixth channel plate 53 in the stacking direction.

An upstream end of the pressure chamber 28 is connected to a downstream end of the second communication hole 27. The pressure chamber 28 is formed by penetrating the seventh channel plate 54 in the stacking direction.

The descender 29 is formed by penetrating the spacer plate 47, the first channel plate 48, the second channel plate 49, the third channel plate 50, the fourth channel plate 51, the fifth channel plate 52, and the sixth channel plate 53 in the stacking direction. The descender 29 is arranged, with respect to the manifold 22, on one side in a width direction, which is orthogonal to the arrangement direction (the left side in FIG. 2). An upstream end of the descender 29 is connected to a downstream end of the pressure chamber 28, and a downstream end of the descender 29 is connected to the base end of the nozzle 21. The nozzle 21 overlaps, for example, the descender 29 in the stacking direction, and is arranged in the center, of the descender 29, in the direction orthogonal to the stacking direction (the width direction).

The vibration plate 55 is stacked on the seventh channel plate 54 and covers an upper end opening of the pressure chamber 28.

The actuator 60 includes the common electrode 61, a piezoelectric layer 62 and individual electrodes 63. The common electrode 61, the piezoelectric layer 62 and the individual electrodes 63 are arranged in this order from the lower side. The common electrode 61 covers the entire surface of the vibration plate 55 via the insulating film 56. The piezoelectric layer 62 covers the entire surface of the common electrode 61. Each of the individual electrodes 63 is to correspond to one piece of the pressure chamber 28, and the individual electrodes 63 are arranged on the piezoelectric layer 62. One piece of an actuator 60 is constructed by one piece of the individual electrode 63, the common electrode

61, and a part, of the piezoelectric layer 62, which is sandwiched between both of the individual electrode 63 and the common electrode 61 (an active part of the piezoelectric layer 62, to be described later on).

Each of the individual electrodes 63 is electrically connected to a driver IC. The driver IC receives a control signal from a controller 71 which will be described later; and the driver IC generates a drive signal, and applies the drive signal to each of the individual electrodes 63. On the other hand, the common electrode 61 is always held at the ground potential. In such a configuration, an active part of the piezoelectric layer 62 expands and contracts in a plane direction together with the two electrodes 61 and 63 in accordance with the drive signal. In response to this, the vibration plate 55 deforms in a direction in which the vibration plate 55 increase or decrease the volume of a certain pressure chamber 28 which corresponds to the certain individual electrode 63. As a result, a discharge pressure for discharging the ink droplet from a certain nozzle 21 which corresponds to the certain pressure chamber 28 is applied to the ink in the certain pressure chamber 28.

In the discharge head 20 as described above, the supply port 22*a* is connected to the sub tank 18 via a pipe. In a case that a pressurizing pump provided on the pipe is driven, the ink flows from the sub tank 18 through the pipe and flows into the manifold 22 via the supply port 22*a*. Then, the ink flows from the manifold 22 into the supply throttle channel 26 via the first communication hole 25, and flows from the supply throttle channel 26 into the pressure chamber 28 via the second communication hole 27. Then, the ink flows through the descender 29 and flows into the nozzle 21. Here, in a case that the discharge pressure is applied to the ink in the pressure chamber 28 by the actuator 60, the ink droplets are discharged from the nozzle hole 21*a*.

Figure 4:
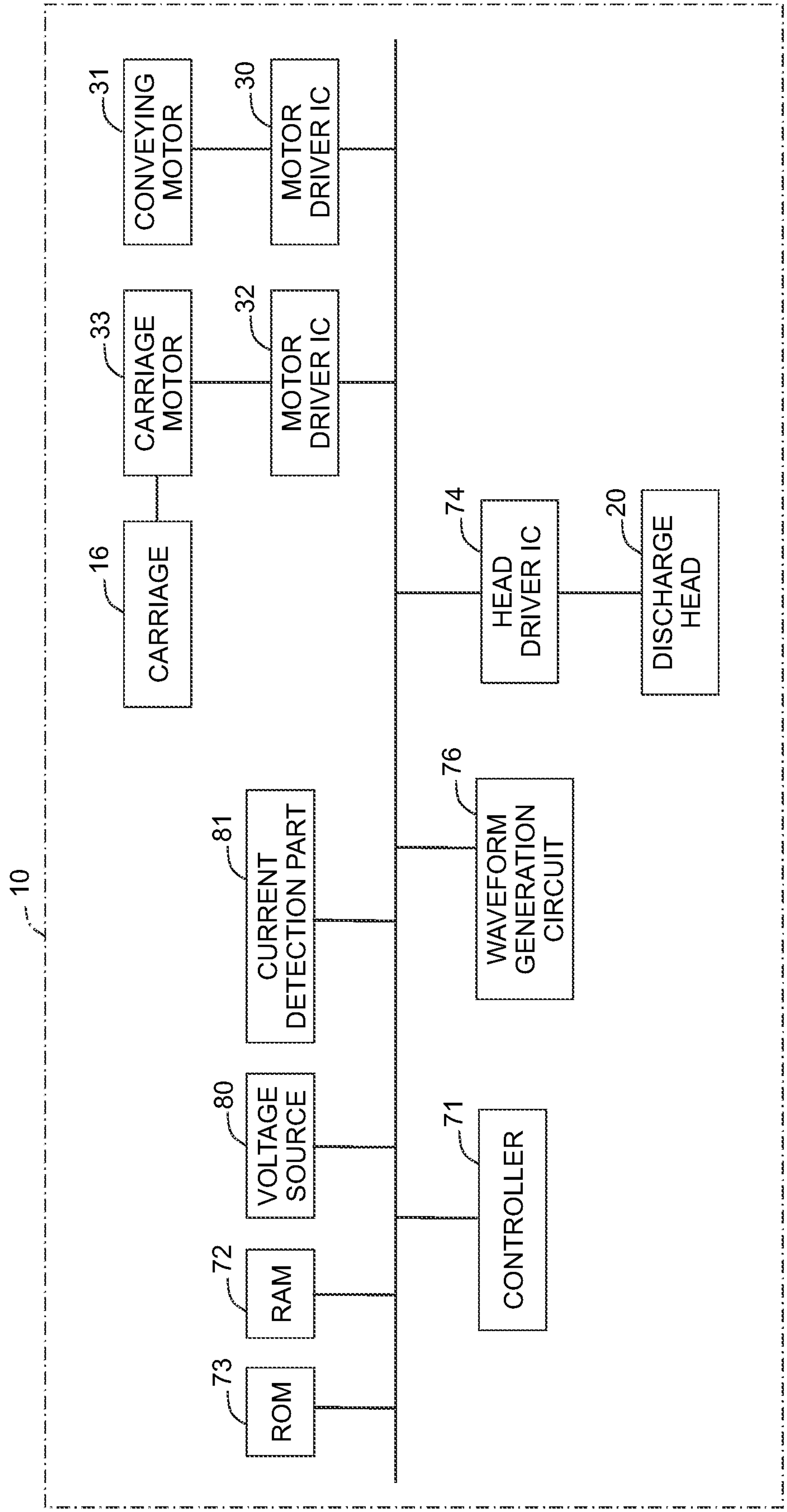
FIG. 4 is a block diagram depicting the configuration of the liquid droplet discharge apparatus of FIG. 1.

As depicted in FIG. 4, in addition to the above constituent components, the liquid droplet discharge apparatus 10 includes the controller 71 constructed of a CPU, etc., a RAM 72 and a ROM 73 each corresponding to a storage part, a head driver IC 74, a waveform generation circuit 76, a voltage source 80, a current detection part 81, motor driver ICs 30 and 32, a conveying motor 31, and a carriage motor 33.

The voltage source 80 generates a potential difference between the discharge head 20 and the electrode 84 in accordance with an instruction of the controller 71. The current detection part 81 detects a current flowing between the discharge head 20 and the electrode 84 in a case that the potential difference is generated between the discharge head 20 and the electrode 84 by the voltage source 80.

The controller 71 receives a result of the detection by the current detection part 81. The controller 71 causes the discharge head 20 to discharge an ink droplet Id (FIG. 6) in a state that the voltage source 80 generates the potential difference between the discharge head 20 and the electrode 84. Then, the controller 71 calculates the volume of the ink droplet Id based on a current value (a value of the current), which is detected by the current detection part 81 under a condition that the ink droplet Id is discharged. The details of a method of calculating the volume of the ink droplet Id will be described later.

The RAM 72 stores discharge data, etc. Further, the RAM 72 previously stores, as a reference value, the product of a value of the current to be detected by the current detection part 81 in a case that the volume of the ink droplet Id is normal and a time during which the current flows. The ROM 73 stores a liquid droplet discharge program, a control program for performing various data processing, etc.

The head driver IC 74 receives the instruction from the controller 71 and causes the discharge head 20 to discharge the ink droplet Id. The motor driver IC 30 receives an instruction from the controller 71 and performs drive control of the conveying motor 31. The conveying motor 31 conveys the print medium W in the conveying direction by operating the conveying roller 15. Further, the motor driver IC 32 receives an instruction from the controller 71 and performs drive control of the carriage motor 33. The carriage motor 33 moves the discharge head 20 in the main scanning direction by operating the carriage 16.

FIG. 5 is a plan view depicting a shape of the electrode 84 in the purge unit 83. As depicted in FIG. 5, the electrode 84 is provided, for example, as electrodes 84 arranged at the four corners, respectively, in the purge unit 83. The electrodes 84 are arranged so as to face the discharge head 20 in a case that the discharge head 20 is moved into the purge unit 83. The shape of the electrode 84 is not limited to the above example, provided that a potential difference can be generated between the discharge head 20 and the electrode 84 by the voltage source 80. As another example of the electrode 84, for example, the electrode 84 may be formed in a cross shape in a plan view.

Next, the method of calculating the volume of the ink droplet Id by the controller 71 will be explained with reference to the drawings.

In a case that the ink droplet Id is to be discharged by the discharge head 20 in the state that the potential difference is generated between the discharge head 20 and the electrode 84 by the voltage source 80, electric charges corresponding to the charge amount of the ink droplet Id are induced on the discharge head 20 and the electrode 84, respectively. Therefore, a current corresponding to a difference between the charge amount induced on the discharge head 20 and the charge amount induced on the electrode 84 flows between the discharge head 20 and the electrode 84. At this time, the current detection part 81 detects the current flowing between the discharge head 20 and the electrode 84. Here, the charge amount of the ink droplet Id is a charge amount corresponding to the volume of the ink droplet Id. Further, the current value detected by the current detection part 81 is proportional to the charge amount of the ink droplet Id. Therefore, as the volume of the ink droplet Id increases, the current value increases. The volume of the ink droplet Id can be obtained by detecting the current value by the current detecting part 81.

Figure 6:
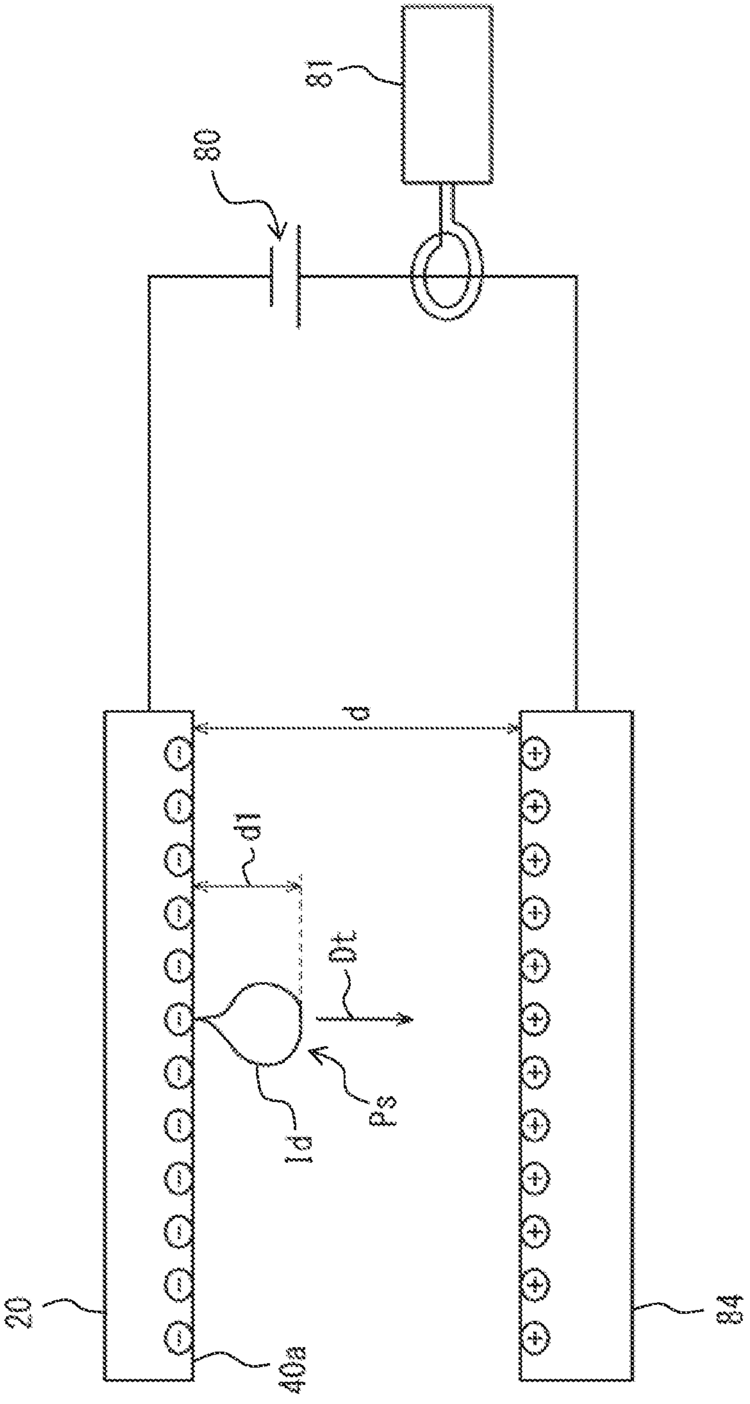
FIG. 6 is a view for explaining a method of calculating a volume of an ink droplet in a case that the ink droplet is separated from a nozzle surface.

As depicted in FIG. 6, in a case that the ink droplet Id from the discharge head 20 is discharged from the nozzle surface 40*a* in the state that the potential difference is generated between the discharge head 20 and the electrode 84 by the voltage source 80, a distance d1 from the nozzle surface 40*a* to a tip position Ps of the ink droplet Id in a discharge direction Dt is less than a threshold value. This threshold is determined previously in accordance with the type (kind) of the ink. At this time, the charge amount Q induced on the nozzle surface 40*a* by the ink droplet Id is represented by a calculation formula: $Q=k'\times\varepsilon\times(S/d)\times V1$. Therefore, the controller 71 calculates the charge amount Q by the calculation formula: $Q=k'\times F\times(S/d)\times V1$. In the above-described calculation formula, k' is a predetermined coefficient, ε is the permittivity of air, S is a cross-sectional area of the ink droplet Id, d is the distance between the nozzle surface 40*a* and the electrode 84, and V1 is a voltage applied by the voltage source 80.

Here, in a case that k is a predetermined coefficient, it is possible to derive a calculation formula: $S=k\times Q$, in accordance with the above-described calculation formula. Since the cross-sectional area of the ink droplet Id is expressed by $S=\pi\times r^2$, it is possible to derive a calculation formula: $r=(k\times Q/\pi)^{1/2}$.

In a case that the volume of the ink droplet Id is V, since V is represented by: $V=(4/3)\times\pi\times r^3$, it is possible to derive a calculation formula: $V=(4/3)\times\pi\times(k\times Q/\pi)^{3/2}$ based on the above calculation formula for the "r", and further to derive a calculation formula: $V=(4/3)\times\pi^{1/3}\times(k\times Q)^{3/2}$.

Therefore, as the calculation formula for calculating the volume of the ink droplet Id, it is possible to obtain a calculation formula: $V=k1\times Q^{3/2}$. The controller 71 calculates the volume V of the ink droplet Id by a calculation formula: $V=k1\times Q^{3/2}$. In other words, the volume of the ink droplet Id is proportional to $Q^{3/2}$. Note that the "k1" is represented by $k1=(4/3)\times\pi^{1/3}\times k^{3/2}$. Here, the controller 71 is capable of obtaining the time during which the current flows, based on the value of the current detected by the current detection part 81. In this case, since $Q=i\times t$ is derived provided that the current value is i, the time during which the current flows is t, the controller 71 is capable of calculating the volume V of the ink droplet Id by a calculation formula: $V=k1\times(i\times t)^{3/2}$. In such a manner, the controller 71 calculates the charge amount Q charged in one ink droplet Id, based on the product of the current value i detected by the current detection part 81 and the time t, to thereby make it possible to calculate the volume of the ink droplet Id.

As described above, the controller 71 calculates the volume of the ink droplet Id, and the controller 71 determines whether or not there is any discharge abnormality in the nozzle 21, in accordance with the calculated volume of the ink droplet Id, periodically and before the printing. In this case, the controller 71 calculates the volume of the ink droplet Id in a case that the ink droplet Id is discharged, with respect to each of the nozzles 21, and with respect to each of the nozzle arrays in the discharge head 20. From the viewpoint of reducing the influence of noise, it is allowable that the ink droplet Id is discharged, for example, 10 times per each of the nozzles 21 so as to calculate the average value of the volumes of the ink droplet Id, and to make the determination regarding the presence or absence of discharge abnormality by comparing the average value with the threshold value.

In the present embodiment, the controller 71 determines whether or not there is a discharge abnormality of the nozzle 21 according to the calculated volume of the ink droplet Id; in a case that there is any discharge abnormality, the controller 71 changes the discharge waveform in a correction processing. In this case, the controller 71 determines whether or not to correct the volume of ink droplet Id based on a comparison between the reference value stored in the RAM 72 and the product of the current value i detected by the current detection part 81 and the time t during which the current flows (that is, the charge amount Q).

In the correction processing for changing the discharge waveform, a correction function in accordance with the calculated volume of the ink droplet Id is used. The correction function defines a voltage of the discharge pulse and a timing (positions at each of which the discharge pulse is made to be High or Low, with respect to each period of the time) of the discharge pulse in the discharge waveform. The controller 71 corrects the discharge waveform by using the above-described correction function based on the calculated volume of the ink droplet Id. Then, the controller 71 causes the waveform generation circuit 76 to generate a corrected discharge waveform based on the result of the calculation. Note that the above-described correction function is previously stored in the RAM 72 or the ROM 73.

Figure 7:
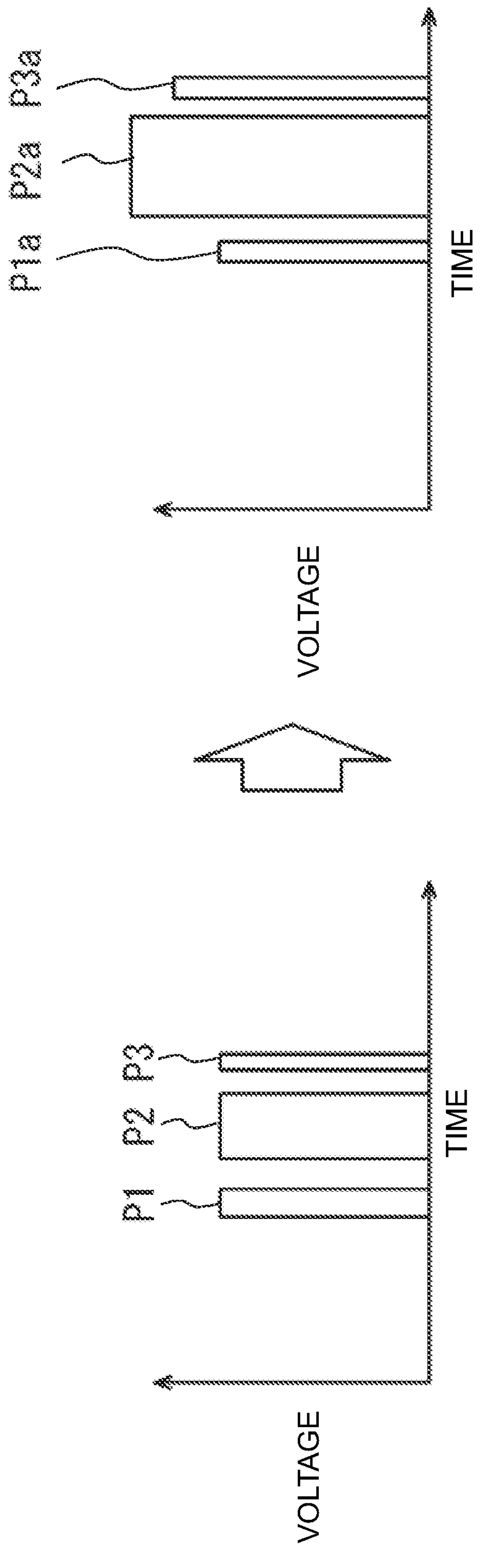
FIG. 7 is a view of discharge waveforms before and after a correction.

For example, it is allowable to perform the correction of the discharge waveform as follows. As depicted in FIG. 7, before the correction processing, the voltage of discharge pulses P1, P2, and P3 are same, whereas a pulse width and a discharge timing (time at which each of the discharge pulses P1, P2 and P3 is made to be High) are mutually different among the discharge pulses P1, P2 and P3. In a case that the discharge abnormality is recognized, a discharge waveform including discharge pulses P1*a*, P2*a*, and P3*a* is generated. The discharge pulse P1*a* has a lower voltage and a smaller pulse width than those of the discharge pulse P1, and has a discharge timing which is different from that of the discharge pulse P1. The discharge pulse P2*a* has a higher voltage and a larger pulse width than those of the discharge pulse P2, and has a discharge timing which is different from that of the discharge pulse P2. The discharge pulse P3*a* has a higher voltage and a larger pulse width than those of the discharge pulse P3, and has a discharge timing which is different from that of the discharge pulse P3.

As described above, according to the liquid droplet discharge device 10 of the present embodiment, the controller 71 calculates the volume of the ink droplet Id, based on the value of the current flowing between the electrode 84 and the discharge head 20 and detected by the current detection part 81. With this, it is possible to determine, based on the volume of the ink droplet Id, whether or not the actuator 60, which is the piezoelectric element, has deteriorated in the preceding stage before the nozzle reaches the non-discharge. Further, it is possible to perform the correction for adjusting the volume of the ink droplet Id, based on the result of the discrimination. As a result, it is possible to suppress a deterioration of the discharge accuracy of each of the nozzles 21 and to obtain a desired image quality.

Furthermore, in the present embodiment, the controller 71 calculates the volume of the ink droplet Id based on the product of the value of the current detected by the current detection part 81 and the time during which the current flows. In this case, the volume of the ink droplet Id can be easily calculated.

Moreover, in the present embodiment, the controller 71 calculates the charge amount charged on one ink droplet Id, from the current value detected by the current detection part 81, and calculates the volume of the ink droplet Id based on the calculated charge amount. In this case, the volume of the ink droplet Id can be calculated almost accurately.

Further, in the present embodiment, under a condition that the ink droplet Id discharged from the discharge head 20 is separated from the nozzle surface 40*a*, in a case that the distance d1 from the nozzle surface 40*a* to the tip position Ps in the discharge direction Dt of the ink droplet Id is less than the threshold value, the volume of the ink droplet Id is calculated by the calculation formula: $V=k1\times Q^{3/2}$. In this case, it is possible to accurately calculate the volume of the ink droplet Id, based on the state of the ink droplet Id at the time of discharge.

Furthermore, in the present embodiment, the electrode 84 is provided on the inside of the purge unit 83. In this case, since it is not necessary to provide a new space at the outside of the purge unit 83, the space can be saved.

Moreover, in the present embodiment, the controller 71 determines whether or not to correct the volume of the ink droplet Id, based on the comparison between the reference value and the product of the value of the current detected by the current detection part 81 and the time during which the current flows. By providing the reference for the comparison, it is possible to easily perform the determination as to whether or not to perform the correction.

Further, in the present embodiment, the controller 71 changes the discharge waveform in a case that the controller 71 performs the above-described correction. In this case, it is possible to correct the volume of the ink droplet Id by a simple method.

Second Embodiment

A second embodiment will be explained with reference to FIGS. 8 and 9.

Figure 8:
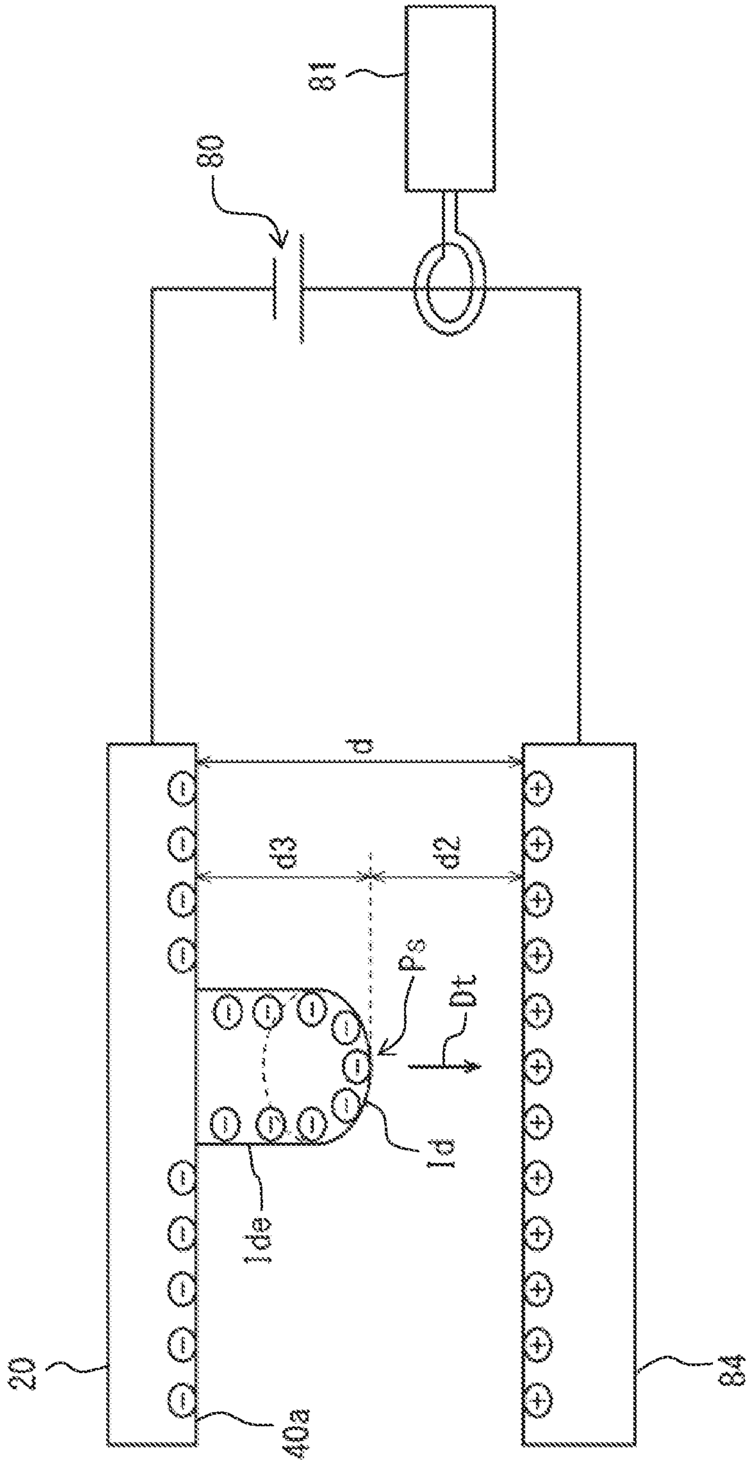
FIG. 8 is a view for explaining a method for calculating a volume of an ink droplet extending in a discharge direction under a condition that the ink droplet is separated from the nozzle surface.

As depicted in FIG. 8, there is such a case that, after an ink column Ide protrudes from the nozzle surface 40*a* and extends in the discharge direction Dt, a tip part of the ink column separates from the nozzle surface 40*a*, as an ink droplet Id, due to the viscosity of the ink, etc. In this case, a distance d3 from the nozzle surface 40*a* to the tip position Ps of the ink column Ide in the discharge direction Dt in a case that the ink droplet Id separates from the nozzle surface 40*a* is not less than a threshold value. In this case, the volume of the ink droplet Id can be calculated as follows. Note that, in FIG. 8, a distance between the tip position Ps of the ink column Ide and the electrode 84 is defined as a distance d2, and a value obtained by subtracting the distance d2 from the distance d which is from the nozzle surface 40*a* to the electrode 84, is defined as the distance d3.

Figure 9:
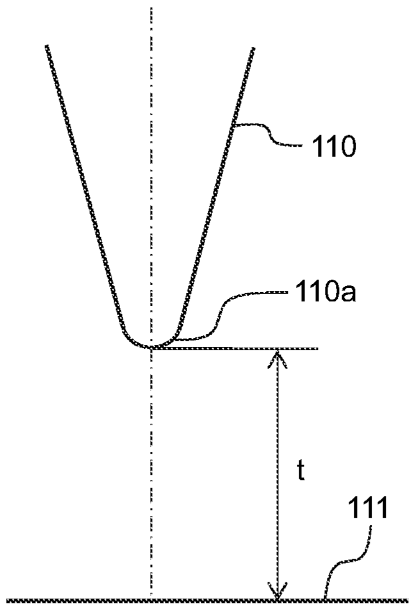
FIG. 9 is a view for explaining a method for calculating an electric field strength of a needle electrode.

As depicted in FIG. 9, it is possible to use a calculation formula for obtaining an electric field strength in a case that a voltage is applied between a needle electrode 110 having a needle tip 110*a* of a radius of curvature R and a flat plate electrode 111 having a gap length of "t" with respect to the needle electrode 110. An electric field strength E of the needle tip 110*a* in a case that a voltage V2 is applied between the needle electrode 110 and the flat plate electrode 111 can be generally calculated by a calculation formula (hereinafter referred to as an approximate formula) represented by: $E=2\times V2/[2.3R\times \log(1+4t/R)]$. By using this approximate formula, the volume of the ink droplet Id in the case of FIG. 8 is obtained as follows. Note that log (x) is a logarithm of x with the base 10, and that LN (x) (which will be described later) is a logarithm of x with the base "e".

A cross-sectional area of the ink droplet Id is represented by S, 2.3 log (x)=LN (x) is true in the above-described approximate formula, the gap length t is replaced by the distance d2, and the radius of curvature R is replaced by the radius r of the ink droplet Id. Since the charge amount Q is proportional to E×S, a calculation formula: $Q=k4\times 2\times V2/[r\times LN(1+4\times d2/r)]$ can be derived. In the formula, "k4" is a predetermined coefficient. Here, since $S=\pi\times r^2$, a calculation formula: $Q=k4\times 2\times V2\times\pi\times r/LN(1+4\times d2/r)$ can be derived. Note that, however, since the LN (x) does not change significantly even in a case that the radius "r" of the ink droplet Id changes, a calculation formula: Q is proportional to "r" can be derived. According to the above-described calculation formula of Q and the calculation formula of $V=(4/3)\times\pi\times r^3$, the volume of the ink droplet Id can be regarded as: $V=k2\times Q^3$. Therefore, in a case that the distance d3 is not less than the threshold value, the controller 71 calculates the volume of the ink droplet Id by the calculation formula: $V=k2\times Q^3$.

According to the present embodiment, in the case that the distance d3 is not less than the threshold value, the controller 71 calculates the volume of the ink droplet Id by the calculation formula: $V=k2\times Q^3$. In this case, in a similar manner to the first embodiment, it is possible to accurately or appropriately calculate the volume of the ink droplet Id, in accordance with the state of the ink droplet Id at the time of discharge.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(Modifications)

In the first embodiment, the volume of the ink droplet Id is calculated by the calculation formula: $V=k1\times Q^{3/2}$. In the second embodiment the volume of the ink droplet Id is calculated by the calculation formula: $V=k2\times Q^3$. In this regard, considering that the degree of change in the volume V of the ink droplet Id with respect to the different charge amounts Q in the first and second embodiments is approximately in a range of 0.5 times to 2.0 times, the relationship between the volume of the ink droplet Id and the charge amount Q can be regarded as linear. Therefore, the volume of the ink droplet Id can be represented, provided that k3 is a predetermined coefficient, by a calculation formula: $V=k3\times Q$. Therefore, the controller 71 can calculate the volume of the ink droplet Id by the calculation formula: $V=k3\times Q$. In this case, since the volume of the ink droplet Id and the charge amount are in a proportional relationship, the calculation of the volume becomes easy. Note that it is allowable to use a charge amplifier, rather than using the current detection part 81, so as to construct a circuit in which the charge amount can be directly obtained by the charge amplifier.

Further, in the above-described embodiments, although the voltage, the pulse width, and the discharge timing are changed in the correction processing of the discharge waveform, the present disclosure is not limited to this. The content of the correction processing is merely an example; it is possible to appropriately set the combination of the voltage, the pulse width and the discharge timing which are to be changed before and after the correction processing.

Furthermore, the ink used in the above-described embodiments is not particularly limited, provided that the ink droplet Id is chargeable; it is possible to use, for example, a variety of kinds of the ink, such as dye ink, a pigment ink, etc.

What is claimed is:

1. A liquid droplet discharge apparatus comprising:

a metallic discharge head configured to discharge a liquid droplet onto a print medium;

an electrode arranged facing the discharge head;

a voltage source configured to generate a potential difference between the discharge head and the electrode;

a current detection part configured to detect a current flowing between the discharge head and the electrode;

a controller, and a storage part in which a product of the value of the current and a time during which the current flows is previously stored as a reference value, wherein the controller is configured to calculate a volume of the liquid droplet based on a value of the current, which is detected by the current detection part under a condition that the liquid droplet is discharged from the discharge head in a state of the potential difference being generated between the discharge head and the electrode by the voltage source;

wherein the controller is configured to calculate the volume of the liquid droplet based on a product of the value of the current detected by the current detection part and a time during which the current flows, and wherein the controller is configured to determine whether to perform a correction of the volume of the liquid droplet, based on a comparison between the reference value and the product of the value of the current detected by the current detection part and the time during which the current flows.

2. The liquid droplet discharge apparatus according to claim 1, wherein the controller is configured to calculate an amount of charge charged in the liquid droplet by using the value of the current detected by the current detection part, and to calculate the volume of the liquid droplet based on the calculated amount of charge.

3. The liquid droplet discharge apparatus according to claim 2, wherein the discharge head includes a nozzle surface in which a nozzle hole opens, and under a condition that the liquid droplet discharged from the discharge head is separated from the nozzle surface, in a case that a distance from the nozzle surface to a tip position of the liquid droplet in a discharge direction is less than a threshold value, the controller is configured to calculate the volume of the liquid droplet by a calculation formula: $V=k1\times Q^{3/2}$, in the calculation formula, V being the volume of the liquid droplet, Q being the amount of charge, and k1 being a predetermined coefficient, and in a case that the distance is equal to or more than the threshold value, the controller is configured to calculate the volume of the liquid droplet by a calculation formula: $V=k2\times Q^3$, in the calculation formula, V being the volume of the liquid droplet, Q being the amount of charge, and k2 being a predetermined coefficient.

4. The liquid droplet discharge apparatus according to claim 2, wherein the controller is configured to calculate the volume of the liquid droplet by a calculation formula: $V=k3\times Q$, in the calculation formula, V being the volume of the liquid droplet, Q being the amount of charge, and k3 being a predetermined coefficient.

5. The liquid droplet discharge apparatus according to claim 1, further comprising a maintenance unit configured to perform maintenance of the discharge head, wherein the electrode is provided in the maintenance unit.

6. The liquid droplet discharge apparatus according to claim 1, wherein the controller is configured to change a discharge waveform in a case that the controller performs the correction.

* * * * *